(12) United States Patent
Jezouin

(10) Patent No.: US 12,462,178 B2
(45) Date of Patent: Nov. 4, 2025

(54) ELECTROMAGNETICALLY INSULATED SUPERCONDUCTING QUBIT DEVICE

(71) Applicant: ALICE & BOB, Paris (FR)

(72) Inventor: Sébastien Jezouin, Paris (FR)

(73) Assignee: ALICE & BOB, Paris (FR)

( * ) Notice: Subject to any disclaimer, the term of this patent is extended or adjusted under 35 U.S.C. 154(b) by 575 days.

(21) Appl. No.: 17/972,319

(22) Filed: Oct. 24, 2022

(65) Prior Publication Data

US 2023/0130939 A1 Apr. 27, 2023

(30) Foreign Application Priority Data

Oct. 22, 2021 (FR) .......... 2111275

(51) Int. Cl.
*G06N 10/40* (2022.01)

(52) U.S. Cl.
CPC .............. *G06N 10/40* (2022.01)

(58) Field of Classification Search
USPC .......... 716/100
See application file for complete search history.

(56) References Cited

U.S. PATENT DOCUMENTS

| 8,111,083 B1 | 2/2012 | Pesetski et al. | |
|---|---|---|---|
| 10,050,630 B2 * | 8/2018 | Reagor | G06N 10/20 |
| 2011/0117202 A1 * | 5/2011 | Bourke, Jr. | A61N 1/44 |
| | | | 977/773 |
| 2015/0310350 A1 * | 10/2015 | Niskanen | G06N 10/60 |
| | | | 706/46 |
| 2017/0308804 A1 * | 10/2017 | Wabnig | G06N 10/60 |

FOREIGN PATENT DOCUMENTS

WO WO-2015/178990 A2 11/2015

OTHER PUBLICATIONS

Helmer, F. et al. "Cavity Grid for Scalable Quantum Computation with Superconducting Circuits." arXiv Preprint arXiv:0706.3625v2, Mar. 24, 2009, pp. 1-6.
Silveirinha, M. G. et al. "Electromagnetic Characterization of Textured Surfaces Formed by Metallic Pins." IEEE Transactions on Antennas and Propagation, vol. 56, No. 2, Feb. 2008, pp. 405-415.

* cited by examiner

*Primary Examiner* — Brian Ngo
(74) *Attorney, Agent, or Firm* — Fenwick & West LLP

(57) ABSTRACT

An electromagnetically insulated superconducting qubit device comprising an electrical conductor having a substantially planar face and an artificial magnetic conductor having a substantially planar face facing the face of said electrical conductor, and one or more qubits made on or in one of said electrical conductor and said artificial magnetic conductor, the dimensions of the constituent elements of the artificial magnetic conductor and the distance separating the face of said electrical conductor and the face of said artificial magnetic conductor being chosen so as to make an electromagnetic band gap structure which comprises the frequencies of said qubits.

13 Claims, 4 Drawing Sheets

ELECTROMAGNETICALLY INSULATED SUPERCONDUCTING QUBIT DEVICE

CROSS REFERENCE TO RELATED APPLICATIONS

This application claims the right of priority based on French Patent Application No 2111275, filed on Oct. 22, 2021, which is incorporated by reference in its entirety.

BACKGROUND

The invention relates to the field of quantum computing, and in particular to the electromagnetic insulation of qubits.

Qubits have to meet two conflicting requirements: the fragility of their quantum state requires them to be as insulated as possible from the outside world, but performing measurements and quantum gates—at the heart of the manufacturing of a quantum computer—requires them to be coupled to external devices such as microwave pulse generators.

Currently, some of the most advanced real-world implementations of qubits are based on the use of superconducting circuits, and this technology is referred to as the "superconducting qubit." Superconducting qubits are coupled to the outside world primarily through the electromagnetic field. To perform measurements and quantum gates, superconducting qubits are usually coupled, possibly through an auxiliary system such as an electromagnetic resonator, to a propagating mode of a transmission line or waveguide that is connected to microwave instruments for checking and measuring the qubits.

Coupling to the propagating mode affects the quantum state of the qubits, but this effect can be limited, for example by filtering the propagating mode. However, any other uncontrolled electromagnetic mode present in the environment of the qubits contributes to the destruction of their quantum states.

One of the main challenges in designing a quantum computer based on superconducting qubits is therefore to design the electromagnetic environment of the qubits in such a way that they can be coupled to transmission lines or waveguides while minimizing the impact of other modes that are inevitably present.

A conventional solution is to insert the superconducting qubit into a box whose fundamental resonance mode is at a higher frequency than the qubit. There are then no electromagnetic modes at or below the qubit frequency. This protects the quantum state of the qubit from radiative losses. This approach is for example described in the paper by Paik et al., "Observation of high coherence in Josephson junction qubits measured in a three-dimensional circuit QED architecture," Physical Review Letters 107, 240501 (2011), and in the paper by Huang et al., "Microwave Package Design for Superconducting Quantum Processors," PRX Quantum 2, 020306 (2021).

In the case of bosonic codes, one of the modes of the box is used as the qubit itself. For practical reasons of manufacturability and insertion of circuits, the box traditionally consists of two parts that are welded together. However, the box-weld interface causes resistive losses that severely limit the lifetime of the quantum state of the qubit, even if the box and weld are made of superconducting materials.

One solution to this problem is to form a cavity inside the bulk of a superconducting material by drilling or milling, for example, tunnels from outside the superconducting bulk. If the transverse cross-section of the tunnel is small enough, the electromagnetic field will not propagate therein below a certain cut-off frequency. By choosing a cut-off frequency that is higher than the frequency of the fundamental mode of the cavity, the latter can therefore be used as a long-life qubit. This type of approach is described in the paper by Reagor et al., "Quantum memory with millisecond coherence in circuit QED," Physical Review B 94, 014506 (2016), and in the paper by Chakram et al., "Seamless High-Q Microwave Cavities for Multimode Circuit Quantum Electrodynamics," Physical Review Letters 127, 107701 (2021).

A drawback of these solutions is the strict requirements for the dimensioning of the box. Indeed, the size of the box and of the transverse cross-section of the tunnel has to be typically less than $c/f$, where f is the qubit frequency and c is the speed of light. This makes the box size relatively small, which is a problem when scaling to many qubits, since all qubits have to be in a same box. Additionally, the limitation of the transverse cross-section of the tunnels poses manufacturing problems, as the tunnels have to be both narrow and long. Furthermore, all the circuits needed to check the qubit have to pass through the tunnels, which causes further difficulties. These restrictions make this solution particularly unsuitable for scaling and industrialization.

SUMMARY

One or more embodiments provide an electromagnetically insulated superconducting qubit device comprising an electrical conductor having a substantially planar face and an artificial magnetic conductor having a substantially planar face facing the face of said electrical conductor, and one or more qubits made on or in one of said electrical conductor and said artificial magnetic conductor, the dimensions of the elements making the artificial magnetic conductor and the distance separating the face of said electrical conductor and the face of said artificial magnetic conductor being chosen so as to make an electromagnetic band gap structure which comprises the frequencies of said qubits. The artificial magnetic conductor comprises a substantially planar electrically conductive base from which a plurality of projections project in a direction substantially orthogonal to the electrically conductive base together forming a bed of nails, and the distance separating the face of said electric conductor and the base of said artificial magnetic conductor at the base of the projections is substantially less than the effective speed of light between the face of said artificial magnetic conductor and the face of said electric conductor divided by twice the largest frequency among said one or more qubits.

This device is particularly advantageous because it allows making a superconducting qubit electromagnetic insulation device able to be scaled. In addition, its manufacture and industrialization are much less problematic.

According to various embodiments, the invention may have one or more of the following characteristics:

the projections are arranged substantially periodically in the plane of the electrically conductive base with a periodicity less than the effective speed of light between the face of said artificial magnetic conductor and the face of said electrical conductor divided by 8 times the smallest frequency among said one or more qubits, the projections have a height substantially greater than the effective speed of light between the face of said artificial magnetic conductor and the face of said electric conductor divided by 4 times the smallest frequency among said one or more qubits, the periodicity of the projections varies by less than 50%, said one or more qubits are made by a two-dimensional superconducting circuit, the superconducting circuit comprises a silicon or aluminum oxide base whose surface is etched, said one or more qubits are made with bosonic-encoded three-dimensional harmonic resonators, the three-dimensional harmonic resonators are made in said electrical conductor, the three-dimensional harmonic resonators are made in the artificial magnetic conductor, the device further comprises a two-dimensional superconducting circuit arranged to control or measure said one or more qubits, the superconducting circuit is disposed substantially against the face of said electrical conductor, substantially against the face of said artificial magnetic conductor or between them, occupying part or all of the space between them, and the electrical conductor is made of aluminum with a degree of purity greater than or equal to 99.99%, niobium, superconducting material or copper covered with a superconducting film such as aluminum, niobium, tantalum, titanium nitride or niobium nitride.

The invention also relates to a quantum computational unit characterized in that it comprises several devices according to one of the preceding claims arranged one after the other along a length direction of the face of the electrical conductor.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
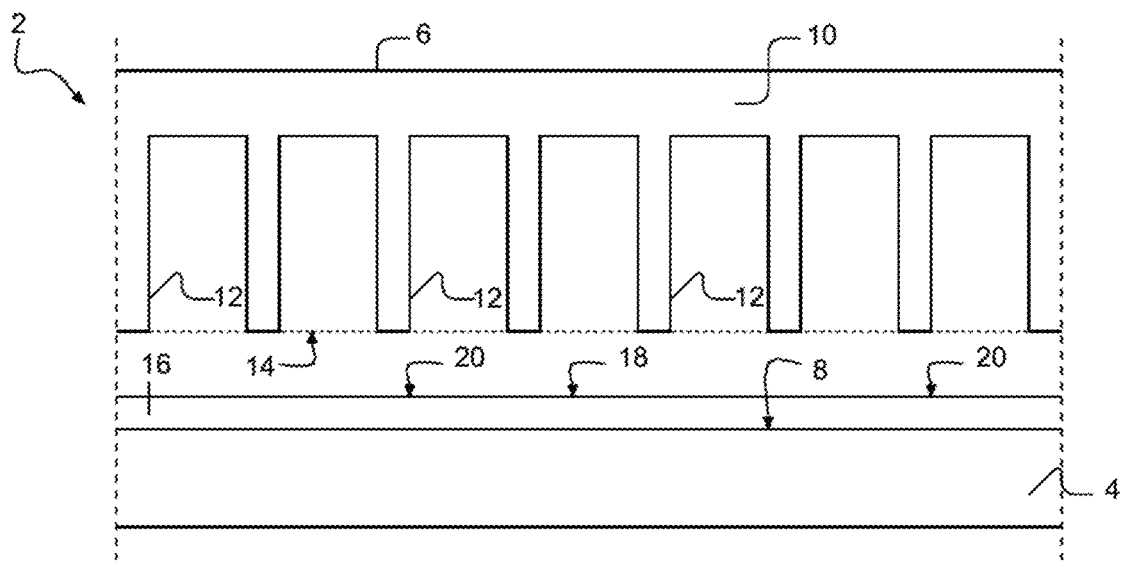
FIG. 1 represents a generic side view diagram of a first embodiment of a superconducting qubit electromagnetic insulation device according to the invention.

FIG. 1 represents a generic side view diagram of a first embodiment of a superconducting qubit electromagnetic insulation device 2 according to one or more embodiments. The device 2 comprises an electrical conductor 4 and an artificial magnetic conductor 6.

In one or more embodiments, the electrical conductor is a machined piece of high purity aluminum (greater than or equal to 99.99%). Its thickness is typically a few millimetres and, in any case, at least equal to the London penetration length in the material. The electrical conductor may optionally receive a surface treatment after machining to increase the purity and/or flatness and/or crystallographic state. This treatment may include acid etching to withdraw aluminum oxide and other surface contaminants, annealing to remove crystallographic defects or electrochemical polishing to reduce surface roughness. The electrical conductor could be machined from another superconducting material such as niobium. Alternatively, it could be machined from a material such as copper, which is not superconducting but has a high thermal conductivity, and then covered, by evaporation or spraying for example, with a superconducting film such as aluminum, niobium, tantalum, titanium nitride or niobium nitride.

The electrical conductor 4 has a substantially planar face 8 facing the artificial magnetic conductor 6.

Artificial magnetic conductors are metamaterials often made in the form of a periodic base fitted with metallization patterns which are designed to implement an electromagnetic band gap, that is, a frequency band in which electromagnetic waves cannot propagate. The paper by M. G. Silveirinha, C. A. Fernandes and J. R. Costa, "*Electromagnetic Characterization of Textured Surfaces Formed by Metallic Pins*" in IEEE Transactions on Antennas and Propagation, vol. 56, no. 2, pp. 405-415, February 2008, doi: 10.1109/TAP.2007.915442, describes the characterization of such materials, particularly when they comprise textured surfaces formed by a periodic arrangement of fine metal pins attached to a conductive ground plane.

In the example described here, the artificial magnetic conductor 6 is of a material similar to that provided for the electrical conductor 4.

Figure 2:
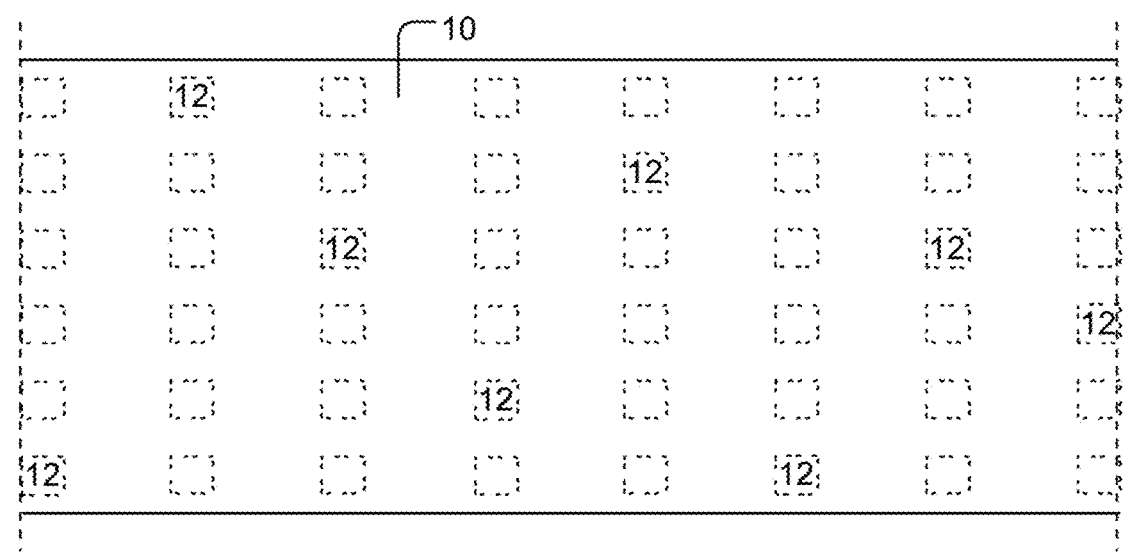
FIG. 2 represents a generic top view diagram of a first embodiment of a superconducting qubit electromagnetic insulation device according to the invention.

The artificial magnetic conductor 6 is referred to as two-dimensional and has here a base 10 and a plurality of nail-shaped projections 12, arranged such that they define a face 14 of the artificial magnetic conductor 6 which is substantially planar. FIG. 2, which is a top view, shows the distribution of the nails 12 in the artificial magnetic conductor 6.

The electrical conductor 4 and the artificial magnetic conductor 6 are arranged in such a way that the face 8 and the face 14 are substantially facing each other and are substantially parallel to each other.

The device 2 further comprises a superconducting circuit 16, typically of silicon (Si) or aluminum oxide (Al2O3), which rests on the face 8 of the electrical conductor 4. A surface 18 of the superconducting circuit 16 facing the face 14 of the artificial magnetic conductor 6 has lithographically made patterns which define superconducting qubits 20 and their control circuits.

The dimensioning of the artificial magnetic conductor 6, on the one hand, and its relative arrangement with the electrical conductor 4, on the other hand, make it possible to make an electromagnetic band gap that is particularly interesting for application to superconducting qubits. Indeed, if this electromagnetic band gap encompasses frequencies associated with the states of the qubits, then they are naturally protected against loss by radiation, which is enhanced by the use of superconducting materials for the electrical conductor 4 and the artificial magnetic conductor 6. Thus, an electromagnetic band gap comprising the frequencies of the qubits formed on the superconducting circuit 16 can be made if the following conditions are met:

the nails 12 are arranged regularly and periodically as represented in FIG. 2, this periodicity being less than the effective speed of light (that is, the average speed of light between face 14 and face 8, which can be decreased depending on the thickness of the superconducting circuit 16 and the optical index of its material) divided by 8 times the highest frequency among the qubits formed on the superconducting circuit 16, that is, a distance of 5.4 mm for a typical frequency of 7 GHz and a relative permittivity equal to 1, the height of the nails 12 from the base 10, that is, the height excluding the thickness of the base 10, is substantially greater than the effective speed of light divided by 4 times the smallest frequency among the qubits formed on the superconducting circuit 16, that is, a distance of 15.0 mm for a typical frequency of 5 GHz and a relative permittivity of 1, and the distance between the effective magnetic surface of the artificial magnetic conductor 6 (not represented in the drawings) and the face 8 is less than the effective speed of light divided by 4 times the largest frequency among the qubits formed on the superconducting circuit 16. This means that the distance between the face 8 and the base 10, taken at the foot of the nails 12, is substantially less than the speed of light divided by twice the highest frequency among the qubits formed in the superconducting circuit 16, that is, a distance of 21.4 mm for a typical frequency of 7 GHz and a relative permittivity equal to 1.

Furthermore, these results can also be obtained if the lines of nails are offset with respect to each other, vertically or horizontally, that is, the nails 12 can be aligned in horizontal lines but offset vertically, or aligned in vertical lines but offset horizontally. Additionally, a tolerance of up to 50% of the periodicity of the nails 12 still gives satisfactory results.

FIG. 2 shows that the nails 12 form together like a bed of nails or a fakir bed. Although the combination of this specific design of the artificial magnetic conductor 6 with the electrical conductor 4 and the dimensions mentioned above gives particularly satisfactory results, other designs of artificial magnetic conductor 6 could be used as long as they allow the electromagnetic band gap relating to the frequencies of the qubits contained in the device 2 to be made.

Additionally, as can be seen from the dashed lines in FIGS. 1 and 2, due to the essentially two-dimensional aspect of the device 2, it can easily be manufactured in large dimensions and provide electromagnetic protection for many qubits. It can also be made in pieces that replicate the structure of the device 2 that are then placed end-to-end with each other. These pieces provide a modular approach to the electromagnetic insulation of superconducting qubits, which is very advantageous for scale production.

Alternatively, the superconducting circuit 16 could rest on the face 14, either facing the face 8 of the electrical conductor 4, or facing the face 14. In the latter case, the design of the superconducting circuit 16 has to be such that the patterns do not define a path likely to come into contact with the nails 12 in order to avoid any risk of short-circuit. The superconducting circuit 16 may also be arranged between the face 8 and the face 14.

Finally, the superconducting circuit 16 may be arranged to occupy substantially all of the space between face 14 and face 8 of the electrical conductor 4. This last alternative is may be advantageous in some embodiments because, when the superconducting circuit 16 occupies substantially all of the space, the effective speed of the light propagating between face 8 and face 14 is reduced, thereby increasing the frequency width of the electromagnetic band gap implemented.

Figure 3:
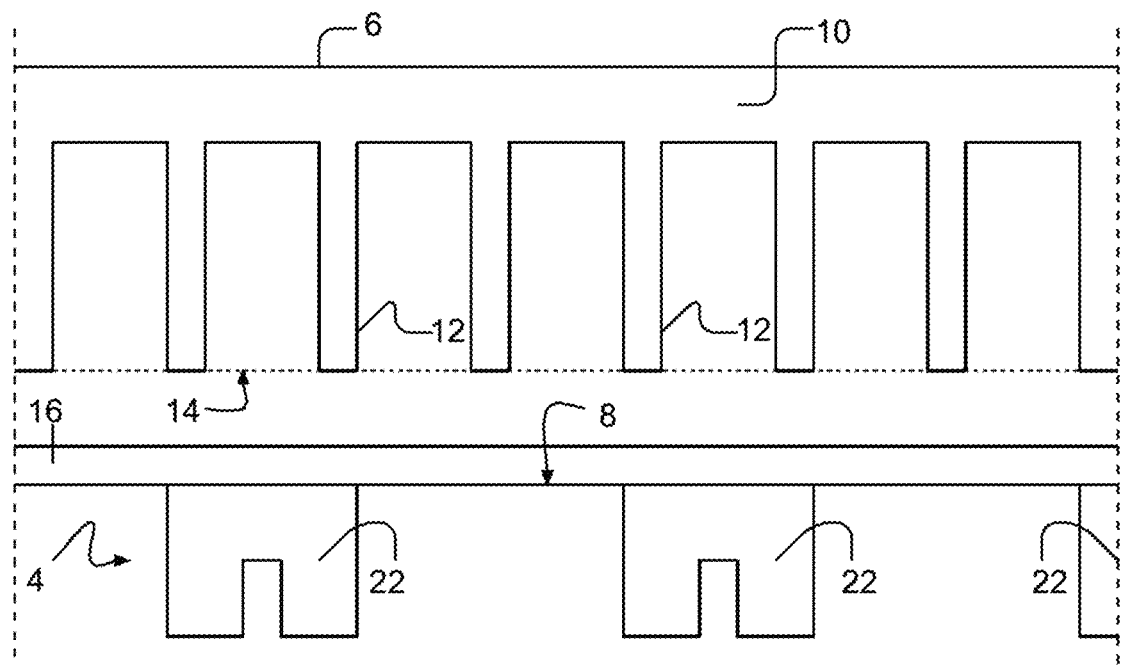
FIG. 3 represents a generic side view diagram of a second embodiment of a superconducting qubit electromagnetic insulation device according to the invention.

FIG. 3 represents a side view of a second embodiment of the device 2 according to the invention, in which the superconducting qubits are no longer stored in a superconducting circuit to form so-called two-dimensional qubits, but are stored in three-dimensional harmonic resonators 22.

The three-dimensional harmonic resonators 22 can in particular be made in the electrical conductor 4, and implement a bosonic encoding. Controlling them may be achieved by a superconducting circuit 16 similar to that of FIG. 1 which again rests on face 8, face 14 or between them (occupying substantially all of the space or not).

In this embodiment, the only place in which photons from the qubits can dissipate by emitting radiation is the space included between face 8 and nails 12. But, as this space makes an electromagnetic band gap that encompasses the frequencies of the qubit states, again the three-dimensional harmonic resonators 22 are protected.

Figure 4:
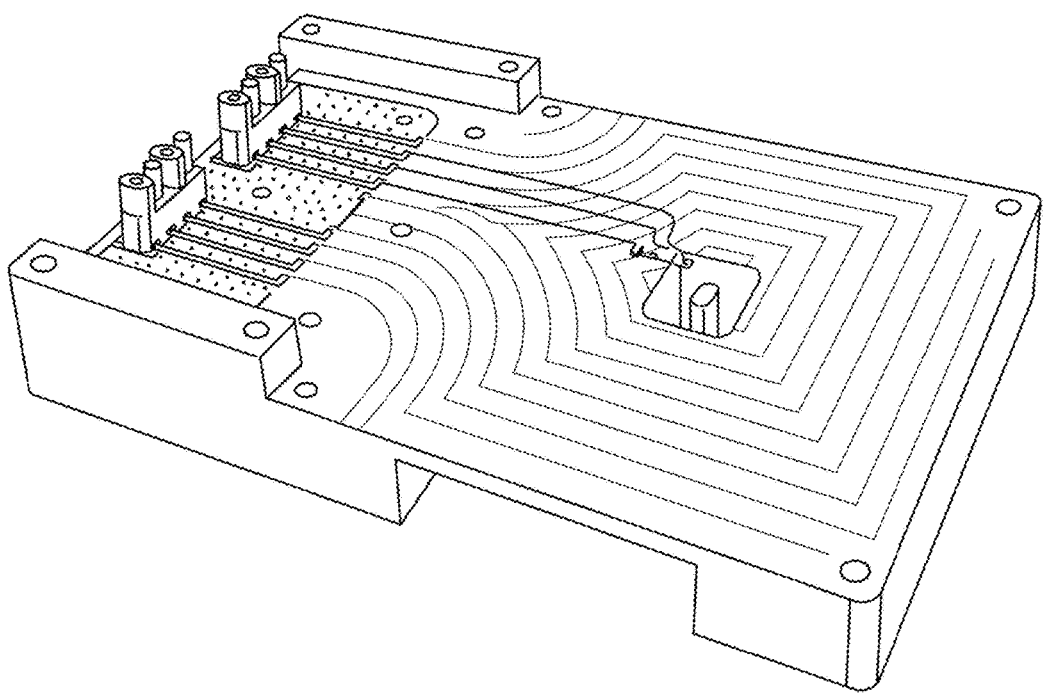
FIG. 4 represents an example embodiment of an electrical conductor according to the embodiment of FIG. 3.
Figure 5:
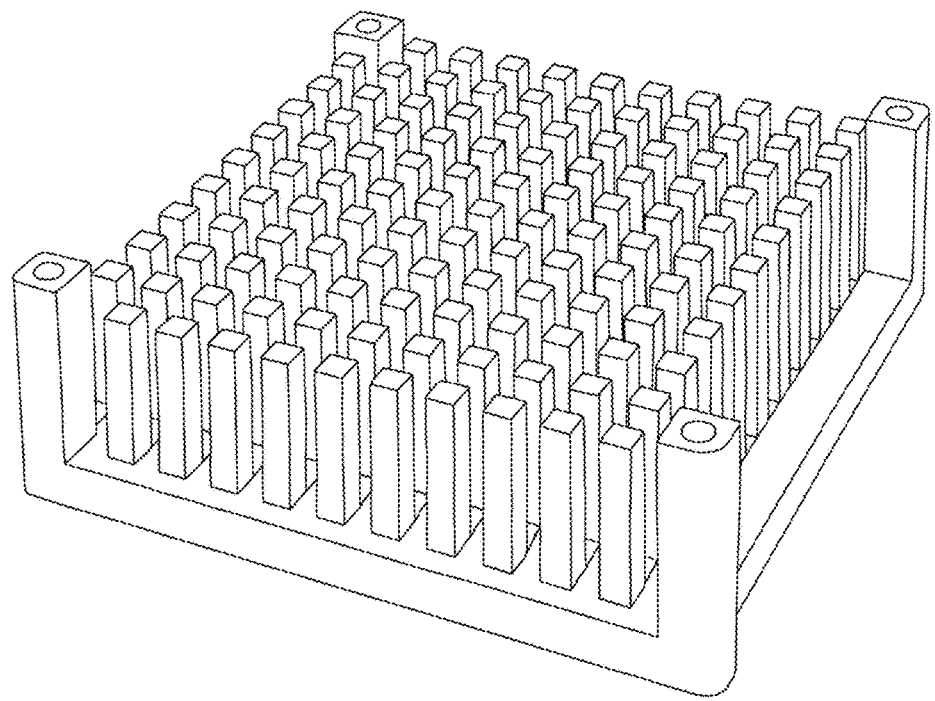
FIG. 5 represents an example embodiment of an artificial magnetic conductor according to the embodiment of FIG. 3.
Figure 6:
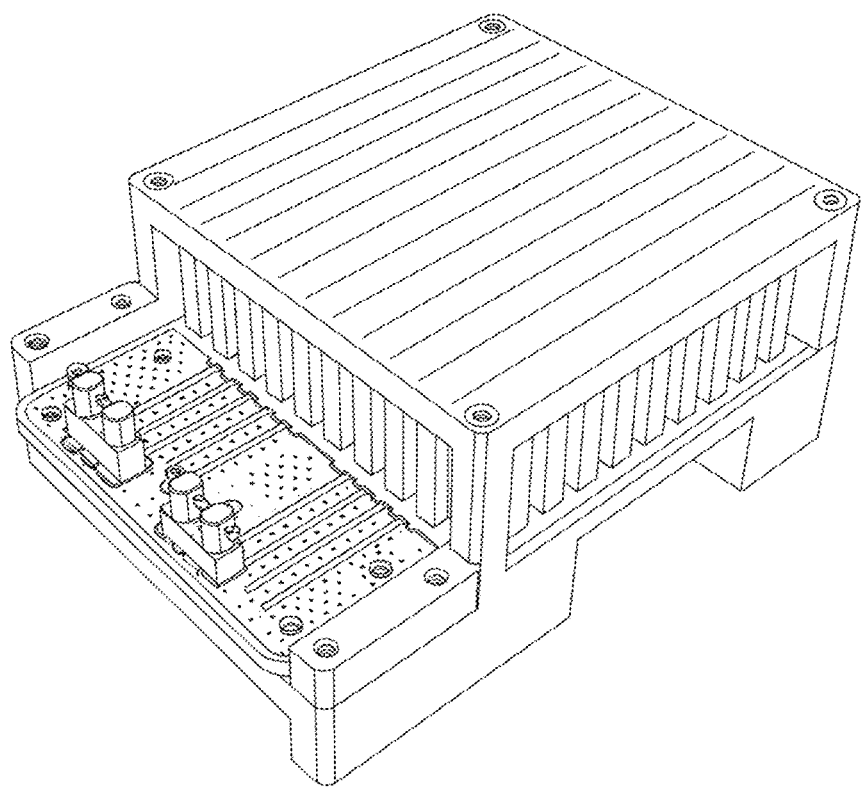
FIG. 6 represents a device according to the embodiment of FIG. 3 made from the elements of FIGS. 4 and 5.

FIGS. 4, 5 and 6 are photographs of a device according to the embodiment of FIG. 3. Thus, FIG. 4 shows the electrical conductor on which an Al2O3 substrate is laid which receives electrical tracks that extend to the cavity of the three-dimensional harmonic resonator, FIG. 5 shows the artificial magnetic conductor and its constituent nails, and FIG. 6 shows the assembly of the elements of FIGS. 4 and 5 together to form the complete device.

Figure 7:
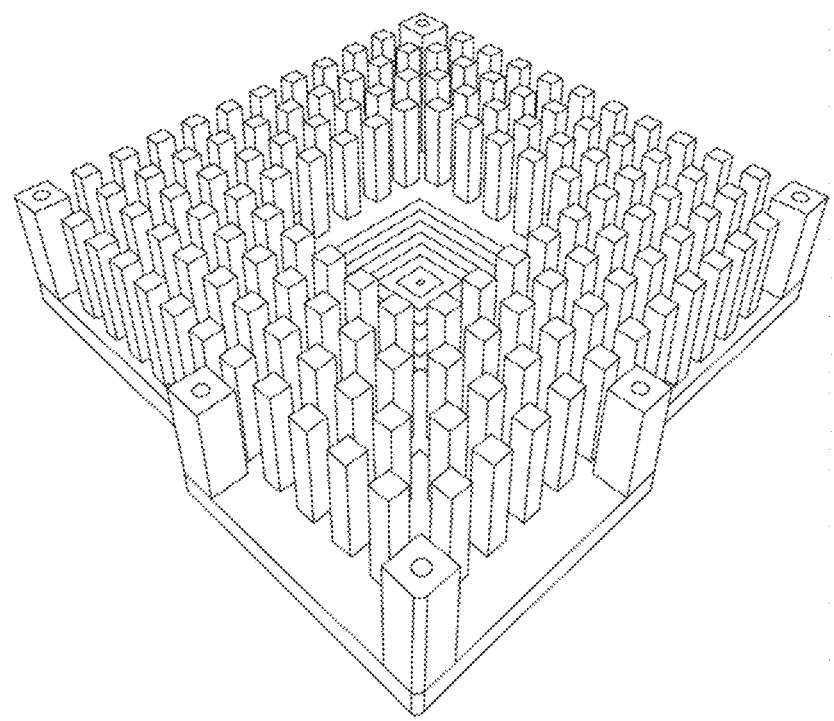
FIG. 7 represents an alternative example embodiment of an artificial magnetic conductor according to the embodiment of FIG. 3.

Furthermore, although the three-dimensional harmonic resonators 22 have been represented as being made in the electrical conductor 4 in FIG. 3, they could also be made between the nails 12 in the artificial magnetic material 6. An example of such an embodiment is represented in FIG. 7.

Another embodiment of the artificial magnetic conductor 6, which has the advantage of being achievable with standard nanofabrication methods, is to make resonant structures within a silicon (Si) or aluminum oxide (Al2O3) substrate fulfilling a similar role to that of the nails 12. These structures consist of patches on the surface of the substrate, connected by vias to the other face of the substrate. The patches, vias and back face of the substrate are metallised by means of a superconducting film (of aluminum, niobium or tantalum, for example). Similar results to those described with reference to the embodiments described above can be obtained by arranging these mushroom-shaped structures regularly and periodically in the substrate, this periodicity being less than the effective speed of light divided by 8 times the highest frequency among the qubits. Their resonance frequency is substantially less than a quarter of the smallest frequency among the qubits.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An electromagnetically insulated superconducting qubit device comprising an electrical conductor having a substantially planar face and an artificial magnetic conductor having a substantially planar face facing the face of said electrical conductor, and one or more qubits made on or in one of said electrical conductor and said artificial magnetic conductor, the dimensions of the elements forming the artificial magnetic conductor and the distance separating the face of said electrical conductor and the face of said artificial magnetic conductor being chosen so as to make an electromagnetic band gap structure which comprises the frequencies of said qubits, the artificial magnetic conductor comprising a substantially planar electrically conductive base from which a plurality of projections project in a direction substantially orthogonal to the electrically conductive base together forming a bed of nails, and the distance separating the face of said electrical conductor and the base of said artificial magnetic conductor at the base of the projections being substantially less than the effective speed of light between the face of said artificial magnetic conductor and the face of said electrical conductor divided by twice the highest frequency among said one or more qubits.

2. The device according to claim 1, wherein the projections are arranged substantially periodically in the plane of the electrically conductive base with a periodicity less than the effective speed of light between the face of said artificial magnetic conductor and the face of said electrical conductor divided by 8 times the smallest frequency among said one or more qubits.

3. The device according to claim 2, wherein the projections have a height substantially greater than the effective speed of light between the face of said artificial magnetic conductor and the face of said electrical conductor divided by 4 times the smallest frequency among said one or more qubits.

4. The device according to claim 1, wherein the periodicity of the projections varies by less than 50%.

5. The device according to claim 1, wherein said one or more qubits are made by a two-dimensional superconducting circuit.

6. The device according to claim 5, wherein the superconducting circuit comprises a silicon or aluminum oxide base which surface is etched.

7. The device according to claim 1, wherein said one or more qubits are made with bosonic-encoded three-dimensional harmonic resonators.

8. The device according to claim 7, wherein the three-dimensional harmonic resonators are made in said electrical conductor.

9. The device according to claim 7, wherein the three-dimensional harmonic resonators are made in the artificial magnetic conductor.

10. The device according to claim 7, further comprising a two-dimensional superconducting circuit arranged to control or measure said one or more qubits.

11. The device according to claim 5, wherein the superconducting circuit is disposed substantially against the face of said electrical conductor, substantially against the face of said artificial magnetic conductor or between them, occupying part or all of the space between them.

12. The device according to claim 1, wherein the electrical conductor is made of aluminum with a degree of purity greater than or equal to 99.99%, niobium, superconducting material or copper covered with a superconducting film such as aluminum, niobium, tantalum, titanium nitride or niobium nitride.

13. A quantum computational unit characterized in that it comprises several devices according to claim 1 arranged one after the other along a length direction of the face of the electrical conductor.

* * * * *